United States Patent [19]
Nakamura et al.

[11] Patent Number: 5,445,241
[45] Date of Patent: Aug. 29, 1995

[54] EXHAUST GAS PIPE ASSEMBLY FOR AN AUTOMOTIVE ENGINE

[75] Inventors: Yoshitaka Nakamura, Higashihiroshima; Keiji Araki, Hiroshima; Kazumi Okamura, Hiroshima; Koji Mizuno, Hiroshima, all of Japan

[73] Assignee: Mazda Motor Corporation, Hiroshima, Japan

[21] Appl. No.: 354,744

[22] Filed: Dec. 8, 1994

Related U.S. Application Data

[63] Continuation of Ser. No. 183,256, Jan. 19, 1994, abandoned, which is a continuation of Ser. No. 831,924, Feb. 6, 1992, abandoned.

[30] Foreign Application Priority Data

Mar. 25, 1991 [JP] Japan ................. 3-017917
Mar. 25, 1991 [JP] Japan ................. 3-060126

[51] Int. Cl.⁶ ............................................. B60K 13/04
[52] U.S. Cl. ..................................... 180/296; 188/379; 248/60; 248/610
[58] Field of Search ................. 180/296; 188/379; 267/153; 60/323; 248/60, 610

[56] References Cited

U.S. PATENT DOCUMENTS

| | | | |
|---|---|---|---|
| 3,488,723 | 1/1970 | Veazie | 60/323 |
| 3,942,599 | 3/1976 | Shimada | 180/296 |
| 4,192,142 | 3/1980 | Häegele | 60/323 |
| 4,550,795 | 11/1985 | Teshima | 267/153 |
| 4,638,965 | 1/1987 | De Bruine et al. | 248/610 |
| 4,824,056 | 4/1989 | Wuebker et al. | 248/610 |

FOREIGN PATENT DOCUMENTS

| | | | |
|---|---|---|---|
| 279710 | 8/1988 | European Pat. Off. | 60/323 |
| 46011 | 3/1982 | Japan | 60/323 |
| 50216 | 3/1985 | Japan | 60/323 |
| 62-67921 | 4/1987 | Japan . | |
| 1-43462 | 12/1989 | Japan . | |
| 2-64712 | 5/1990 | Japan . | |

*Primary Examiner*—Eric D. Culbreth
*Attorney, Agent, or Firm*—Fish & Richardson

[57] ABSTRACT

An automotive engine is generally provided with an exhaust gas pipe assembly extending generally rearwardly from the engine for discharging exhaust gases. The exhaust gas pipe assembly includes a plurality of exhaust gas pipes, at least one chamber formed intermediately of the exhaust gas pipe assembly, a first support member disposed in the proximity of the engine, and at least one second support member disposed in the proximity of the chamber. The first support member can effectively absorb relative displacement between the exhaust gas pipe assembly and the vehicle body in a direction transversely of the vehicle body whereas the second support member can effectively absorb relative displacement between the exhaust gas pipe assembly and the vehicle body in a direction longitudinally of the vehicle body. The exhaust gas pipe assembly further includes a dynamic damper disposed in the proximity of the second support member for reducing vibration of the exhaust gas pipe assembly in directions generally perpendicular to the direction longitudinally of the vehicle body.

22 Claims, 6 Drawing Sheets

EXHAUST GAS PIPE ASSEMBLY FOR AN AUTOMOTIVE ENGINE

This application is a continuation of U.S. application Ser. No. 08/183,256, filed Jan. 19, 1994, now abandoned; which is a continuation of U.S. application Ser. No. 07/831,924, filed Feb. 6, 1992, abandoned.

BACKGROUND OF THE INVENTION

1. Field of the Invention

The present invention relates to an exhaust gas pipe assembly for an internal combustion engine mounted in an automotive vehicle.

2. Description of the Prior Art

An automotive engine is generally provided with an exhaust gas pipe assembly for discharging exhaust gases therethrough. In an automotive vehicle equipped with an internal combustion engine disposed longitudinally thereof, an exhaust gas pipe assembly includes a plurality of exhaust gas pipes extending rearwardly from the engine. The exhaust gas pipe assembly generally further includes a pre-silencer disposed intermediately thereof and a main silencer disposed at a rear portion thereof for reduction of exhaust noise. Because each of the pre-silencer and the main silencer is a chamber having a sufficient volume, these chambers are offset transversely of the vehicle body with respect to an extended line of a longitudinal axis of an engine output shaft i.e., a center line of the vehicle body for prevention of interference between these chambers and a propeller shaft or the like (Japanese Utility Model Laid-open Application (unexamined) No. 2-64712). Accordingly, at least that portion of the exhaust gas pipe assembly which extends rearwardly from an intermediate portion thereof is offset transversely with respect to the center line of the vehicle body.

The generally longitudinally extending exhaust gas pipe assembly is secured at a plurality of locations to the vehicle body (including a power plant system) via support members. Each of the support members includes an elastic member (vibration insulator) made of an elastic material, for example rubber, for absorbing relative displacement or vibration between the exhaust gas pipe assembly and the vehicle body. Each of the support members generally further includes an upper hanger having one end secured to the vehicle body and the other end connected with an upper portion of the elastic member and a lower hanger having one end secured to the exhaust gas pipe assembly and the other end connected with a lower portion of the elastic member.

In such support members, the allowance of displacement of the elastic members, in which displacement may occur, differs according to the direction, as viewed from above. For example, when a long and slender hanger extends through and is connected with an elastic member, the deformation of the elastic member is restrained by the hanger in the direction in which the hanger extends. Accordingly, the allowance of displacement becomes small in this direction. On the other hand, because the deformation of the elastic member is not restrained so much in a direction perpendicular to this direction, the allowance of displacement becomes large. Any support members can effectively absorb relative displacement or vibration between exhaust pipes and the vehicle body in the direction in which the allowance of displacement of the elastic member is large, but they cannot absorb it so much in the direction in which the allowance of displacement is small.

In an automotive vehicle equipped with an internal combustion engine disposed longitudinally thereof, the "rolling" of the engine and a transmission causes displacement or vibration of exhaust gas pipes in a direction transversely of the vehicle body. When an exhaust gas pipe assembly is offset or disposed away from the center line of the vehicle body, as mentioned previously, the transverse displacement or vibration thereof caused by the "rolling" is enlarged. On the other hand, the inertia force produced at the time of acceleration or deceleration or thermal expansion of the exhaust gas pipe assembly causes displacement or vibration in a direction longitudinally of the vehicle body. Accordingly, the exhaust gas pipe assembly is subjected to displacement or vibration at least in the directions longitudinally and transversely of the vehicle body. However, because the aforementioned support members cannot effectively absorb displacement or vibration of the exhaust gas pipe assembly in both the directions, the exhaust gas pipes are subjected to large stresses, which lower the durability thereof.

In an automotive engine such as, for example, a V-type engine having two banks i.e., two rows of cylinders, the banks have respective exhaust gas passages, which join a single exhaust gas manifold disposed downstream thereof (Japanese Utility Model Laid-open Application (unexamined) No. 62-67921).

In an automotive vehicle equipped with a V-type engine disposed longitudinally thereof, two exhaust gas passages generally extend longitudinally thereof on both sides of the engine and a transmission. The two exhaust gas passages join a single exhaust gas manifold disposed rearwardly of the transmission. The exhaust gas manifold generally extends longitudinally of the vehicle body, and therefore, an exhaust gas pipe assembly comprising the two exhaust gas passages and the exhaust gas manifold generally takes the form of a figure "Y".

In the exhaust gas pipe assembly in the form of the figure "Y" is generally employed an triple pipe or Y-shaped pipe integrally formed, for example, by casting. Accordingly, the Y-shaped pipe constitutes part of the two exhaust gas passages and part of the exhaust gas manifold. In other words, each of the exhaust gas passages includes a front portion of the Y-shaped pipe whereas the exhaust gas manifold includes a rear portion of the Y-shaped pipe. The Y-shaped pipe is connected with adjoining pipes by means of flanges.

The exhaust gas pipe assembly is connected at its front portion with two exhaust gas manifolds disposed on both sides of the engine and communicating with combustion chambers defined in respective cylinders. The exhaust gas pipe assembly is further connected to only at least one of the exhaust gas passages with a transmission casing via a support member and at the exhaust gas manifold with the vehicle body via another support member. To enhance the durability of the exhaust gas pipe assembly, the support members must be connected to those portions of the exhaust gas pipe assembly which have high rigidities. To this end, the support members are generally connected with flanges or any other suitable members having relatively high rigidities (Japanese Utility Model Application (examined) No. 1-43462).

When the exhaust gas pipe assembly including a plurality of elements is mounted on the vehicle body, front ends of two exhaust gas pipes constituting respective exhaust gas passages are initially connected with rear ends of the corresponding exhaust gas manifolds. Rear ends of the two exhaust gas pipes are then connected with the corresponding front ends of the Y-shaped pipe. During assembling, there generally arise slight variations in the positions at which the elements are connected i.e., these positions are not always fixed. However, because the configuration of the Y-shaped pipe to be connected with the two exhaust gas pipes cannot be changed, it is difficult for the Y-shaped pipe to absorb such variations. As a result, there arises the problem in that the accuracy in assembling the Y-shaped pipe would be lowered.

SUMMARY OF THE INVENTION

The present invention has been developed to overcome the above-described disadvantages. It is accordingly an object of the present invention to provide an exhaust gas pipe assembly for an automotive engine which is capable of absorbing relative displacement or vibration between exhaust gas pipes and the vehicle body to thereby enhance the durability of the exhaust gas pipes.

Another object of the present invention is to provide an exhaust gas pipe assembly of the above-described type, of which a plurality of elements can be easily assembled even if there are slight variations in the positions at which they are connected.

In accomplishing these and other objects, an exhaust gas pipe assembly according to the present invention comprises a plurality of exhaust gas pipes extending generally rearwardly from an engine, at least one chamber formed intermediately of the exhaust gas pipe assembly, a first support member disposed in the proximity of the engine for supporting the exhaust gas pipe assembly, and at least one second support member disposed in the proximity of the chamber for supporting the exhaust gas pipe assembly. The exhaust gas pipe includes areas with expanded diameters including, for example, the pre-silencer and the catalytic converter. The first and second support members can effectively absorb relative displacement between the exhaust gas pipe assembly and the vehicle body in directions transversely and longitudinally of the vehicle body, respectively.

The exhaust gas pipe assembly further comprises a dynamic damper disposed in the proximity of the second support member for reducing vibration of the exhaust gas pipe assembly in directions generally perpendicular to the direction longitudinally of the vehicle body.

Conveniently, the exhaust gas pipe assembly according to the present invention is mounted on an automotive engine having two rows of cylinders and disposed longitudinally of the vehicle body.

In another aspect of the present invention, as exhaust gas pipe assembly comprises a first exhaust gas pipe disposed on one side of the engine, a second exhaust gas pipe disposed on the other side of the engine, and a generally Y-shaped exhaust gas pipe disposed generally rearwardly of the engine and having two branch pipes. A first branch pipe connected with the first exhaust gas pipe is shorter than a second branch pipe connected with the second exhaust gas pipe.

The exhaust gas pipe assembly further comprises a support member having one end connected with a transmission at a location in the proximity of an extension line of a longitudinal axis of an engine output shaft and the other end connected with a joint between the first exhaust gas pipe and the first branch pipe.

In a further aspect of the present invention, an exhaust gas pipe assembly comprises a pair of front exhaust gas pipes disposed on respective sides of the engine, a generally Y-shaped exhaust pipe having a pipe body and two branch pipes connected with rear ends of the front exhaust gas pipes, respectively, a first rear exhaust gas pipe having a front end connected with a rear end of the pipe body of the Y-shaped exhaust gas pipe and having a chamber formed intermediately thereof, and a second rear exhaust gas pipe having a front end connected with a rear end of the first rear exhaust gas pipe.

The exhaust gas pipe assembly further comprises a first support member having one end connected with a transmission disposed rearwardly of the engine and the other end connected to one of the front exhaust gas pipes, a second support member having one end connected with the chamber and the other end connected with the vehicle body, and a dynamic damper disposed in the proximity of the second support member for reducing vibration of the exhaust gas pipe assembly in directions generally perpendicular to the direction longitudinally of the vehicle body. The first and second support members can effectively absorb relative displacement between the exhaust gas pipe assembly and the vehicle body in directions transversely and longitudinally of the vehicle body, respectively.

BRIEF DESCRIPTION OF THE DRAWINGS

These and other objects and features of the present invention will become more apparent from the following description of preferred embodiment thereof with reference to the accompanying drawings, throughout which like parts are designated by like reference numerals, and wherein.

DETAILED DESCRIPTION OF THE PREFERRED EMBODIMENTS

Figure 1:
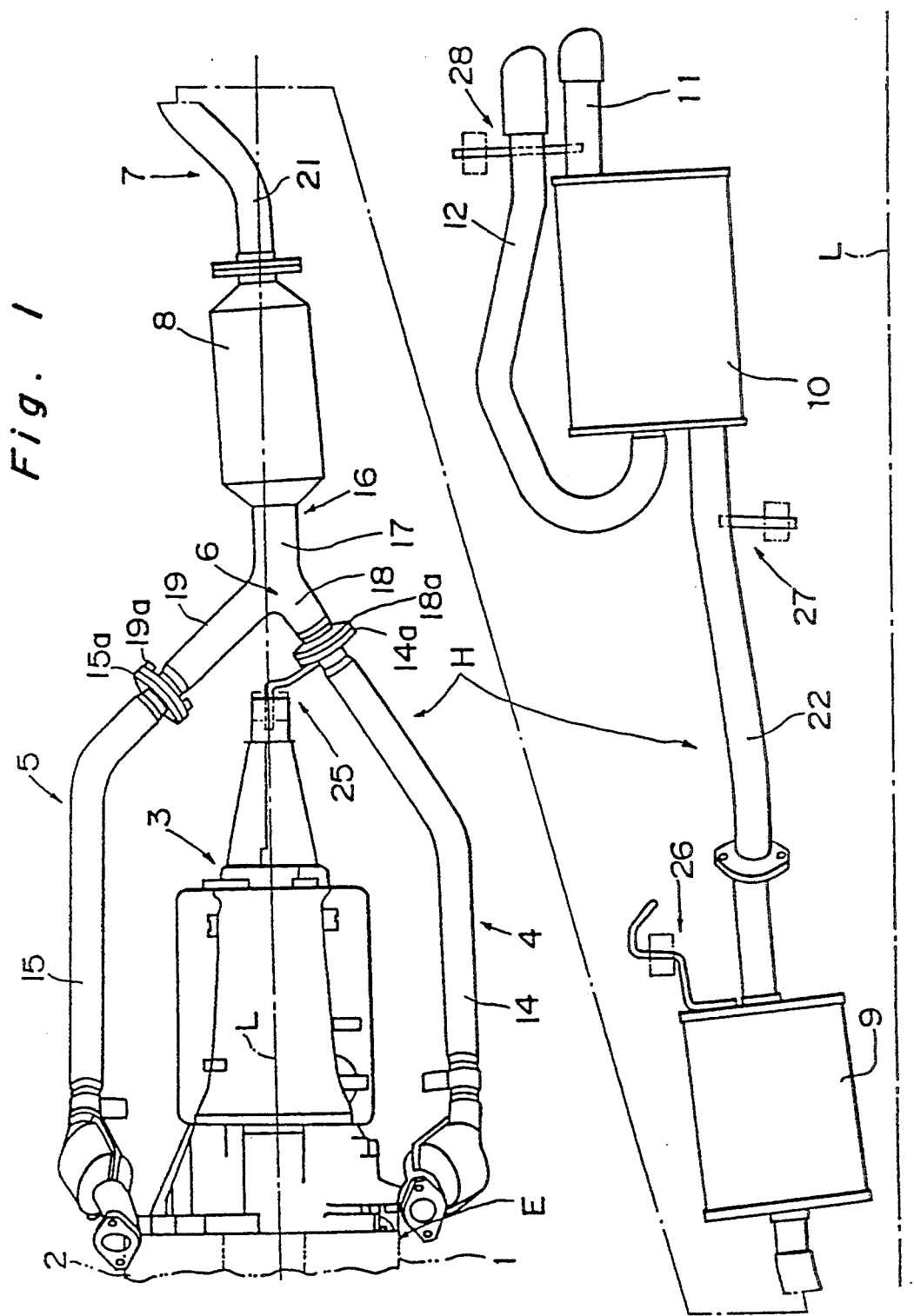
FIG. 1 is a fragmentary top plan view of an exhaust gas pipe assembly according to the present invention.
Figure 2:
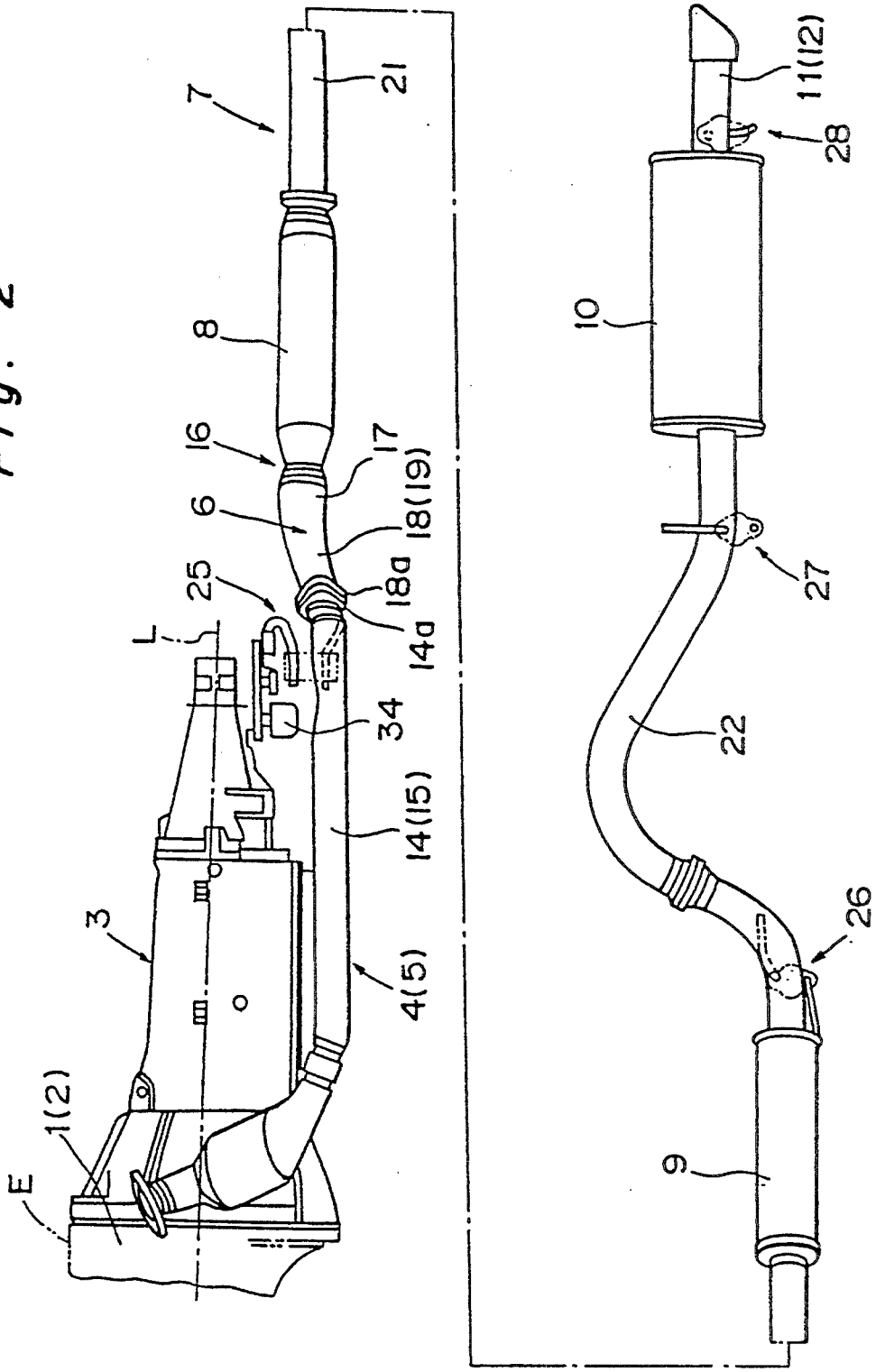
FIG. 2 is a fragmentary side elevational view of FIG. 1.

Referring now to the drawings, there is shown in FIGS. 1 and 2 an automotive internal combustion engine E disposed longitudinally of a vehicle body, a transmission 3 disposed rearwardly of the engine E, and an exhaust gas pipe assembly H extending rearwardly from the engine E for discharging exhaust gases issued from the engine E outside. The engine E is a V-type engine having first and second banks 1 and 2, respectively, disposed longitudinally of the vehicle body.

In the exhaust gas pipe assembly H, exhaust gases issued from cylinders of the first bank 1 are introduced into a first exhaust gas passage 4 whereas those issued from cylinders of the second bank 2 are introduced into a second exhaust gas passage 5. The exhaust gases introduced into both the exhaust gas passages 4 and 5 join together at a location 6 and are introduced into a rear exhaust gas pipe assembly 7. Thereafter, the exhaust gases pass a plurality of serially-connected chambers. The first of the serially-connected chambers includes a catalytic converter 8 containing a three-way catalyst, a pre-silencer 9 and a main silencer 10 in this order and are discharged outside via first and second tail pipes 11 and 12, respectively.

The structure of the exhaust gas pipe assembly H is hereinafter described in detail.

The exhaust gas pipe assembly H includes a first exhaust gas pipe 14 disposed beside the first bank 1 on one side of the transmission 3 and a second exhaust gas pipe 15 disposed beside the second bank 2 on the other side of the transmission 3. As viewed from above, the first and second exhaust gas pipes 14 and 15 are disposed generally symmetrically with respect to a longitudinal axis L of an output shaft of the engine E and the transmission 3 (hereinafter referred to simply as the longitudinal axis L of the output shaft). This axis generally coincides with the center line of the vehicle body. The first and second exhaust gas pipes 14 and 15 are connected at respective front ends thereof with corresponding exhaust gas manifolds (not shown).

In the proxifiity of a rear end of the transmission 3, the first and second exhaust gas pipes 14 and 15 are connected at respective rear ends thereof with a Y-shaped exhaust gas pipe 16. The Y-shaped exhaust gas pipe 16 comprises a pipe body 17 accommodating a catalytic converter 8, a first branch pipe 18, and a second branch pipe 19. Both the first and second branch pipes 18 and 19 are branched from the pipe body 17, and the first branch pipe 18 is shorter than the second branch pipe 19. As viewed from above, a longitudinal axis of the pipe body 17 generally coincides with the longitudinal axis L of the output shaft. The first exhaust gas pipe 14 has a rear flange 14a bolted to a flange 18a of the first branch pipe 18. Similarly, the second exhaust gas pipe 15 has a rear flange 15a bolted to a flange 19a of the second branch pipe 19. The Y-shaped exhaust gas pipe 16 has an appropriate elasticity because the first branch pipe 18 has a relatively high rigidity due to its shorter length whereas the second branch pipe 19 has a relatively low rigidity due to its longer length. The first exhaust gas pipe 14 and the first branch pipe 18 constitute the first exhaust gas passage 4 whereas the second exhaust gas pipe 15 and the second branch pipe 19 constitute the second exhaust gas passage 5.

A rear end of the pipe body 17 of the Y-shaped exhaust gas pipe 16 is connected with a front end of a first rear exhaust gas pipe 21, of which a rear end is connected with a front end of a second rear exhaust gas pipe 22. Accordingly, the rear exhaust gas pipe assembly 7 comprises the pipe body 17 of the Y-shaped exhaust gas pipe 16, the first rear exhaust gas pipe 21, and the second rear exhaust gas pipe 22. The pre-silencer 9 having a sufficient volume is disposed intermediately of the first rear exhaust gas pipe 21 whereas the main silencer 10 having a sufficient volume is connected with a rear end of the second rear exhaust gas pipe 22. The first tail pipe 11 having a relatively short length is connected with a rear portion of the main silencer 10 whereas the second tail pipe 12 having a relatively long length is connected with a front portion of the main silencer 10. By this structural arrangement, the exhaust gas pipe assembly H is of the variable silencer type capable of switching the passage of exhaust gases in compliance with the running conditions of the engine E.

As viewed from above, the first rear exhaust gas pipe 21 is bent rightward with respect to the longitudinal axis L of the output shaft at a location slightly rearwardly of a joint thereof with the pipe body 17 of the Y-shaped exhaust gas pipe 16. That portion of the first rear exhaust gas pipe 21 which extends rearwardly from the bent portion is Offset rightward with respect to the longitudinal axis L of the output shaft. Similarly, the second rear exhaust gas pipe 22 connected with the first rear exhaust gas pipe 21 is also offset rightward. Accordingly, both the pre-silencer 9 and the main silencer 10 are also offset rightward with respect to the longitudinal axis L of the output shaft. The offset arrangement of the first and second rear exhaust gas pipes 21 and 22, the pre-silencer 9, and the main silencer 10 with respect to the longitudinal axis L of the output shaft improves the layout on the vehicle body because these members can be readily mounted on the vehicle body without interfering with the power plant (not shown) such as, for example, a propeller shaft.

The exhaust gas pipe assembly H is generally secured to the vehicle body (including the engine E and the transmission 3) in the manner that relative displacement or vibration of the former with respect to the latter would be absorbed.

In general, the rear flange 14a of the first exhaust gas pipe 14, a rear portion of the pre-silencer 9, and a rear portion of the second rear exhaust gas pipe 22 are connected with the vehicle body via first, second, and third support members 25, 26, and 27, respectively. A front portion of the first tail pipe 11 and a rear portion of the second tail pipe 12 are both connected to the vehicle body via a fourth support member 28. The first and second exhaust gas pipes 14 and 15 are connected with respective exhaust gas manifold (not shown) for support thereof.

Figure 3:
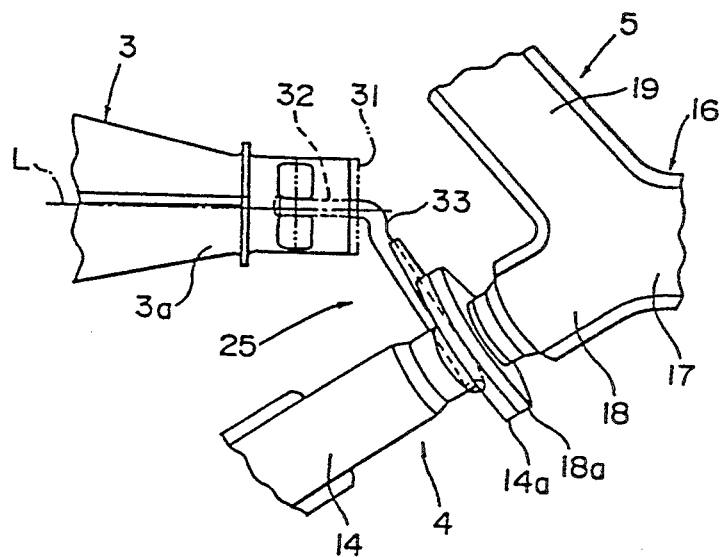
FIG. 3 is a fragmentary top plan view of the exhaust gas pipe assembly in the proximity of a first support member.
Figure 4:
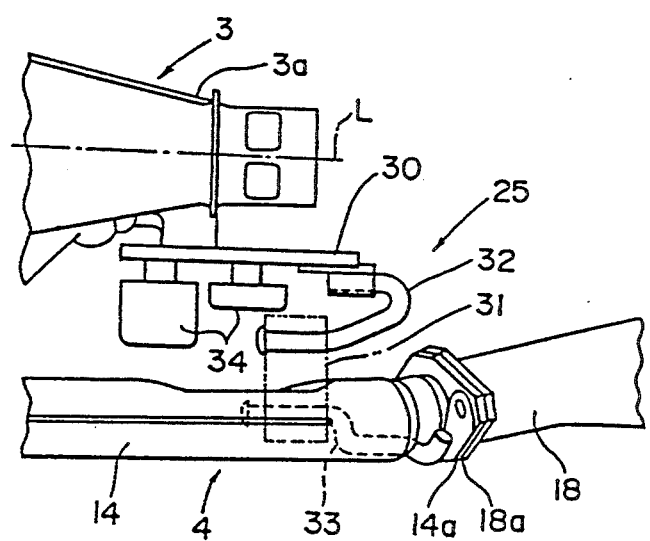
FIG. 4 is a fragmentary side elevational view of FIG. 3.

As shown in FIGS. 3 and 4, the first support member 25 generally comprises an elastic member 31 made of an elastic material, for example rubber, an upper hanger 32, and a lower hanger 33. The upper hanger 32 has one end connected with a rear portion of the lower surface of a bracket 30 secured to the lower surface of a transmission casing 3a and the other end connected with an upper portion of the elastic member 31 whereas the lower hanger 33 has one end connected with the rear flange 14a of the first exhaust gas pipe 14 and the other end connected with a lower portion of the elastic member 31. A plurality of dampers 34 are mounted on the lower surface of the bracket 30 to restrain vibration of the transmission 3.

The elastic member 31 is placed slightly below the longitudinal axis L of the output shaft in the proximity of the rear of the transmission casing 3a. Both the upper and lower hangers 32 and 33 extend horizontally through the elastic member 31 generally below the longitudinal axis L of the output shaft. In other words, the upper and lower hangers 32 and 33 are connected with the elastic member 31 in a manner in which they are vertically spaced from each other and extend in parallel in a direction longitudinally of the vehicle body. In this case, the elastic deformation of the elastic member 31 is restricted by both the upper and lower hangers 32 and 33 in the direction in which these hangers 32 and 33 extend through the elastic member 31 i.e., in the direction longitudinally of the vehicle body. As a result, the range within which displacement of the elastic member 31 is allowed i.e., the allowance of displacement becomes small. In contrast, because the elastic deformation is not restricted so much in a direction transversely of the vehicle body, the allowance of displacement becomes large. As a result, the elastic member 31 of the first support member 25 can effectively absorb relative displacement or vibration between the exhaust gas pipe assembly H (the first exhaust gas pipe 14) and the transmission casing 3a in the direction transversely of the vehicle body.

In general, a reaction force resulting from the torque exerted on an output shaft of the transmission 3 acts so as to rotate the transmission casing 3a in a direction opposite to the direction of the torque. As a result, there arises the so-called "rolling", which causes displacement or vibration of the transmission casing 3a around the longitudinal axis L of the output shaft. Accordingly, the lower surface of the transmission casing 3a would be subjected to displacement or vibration in the direction transversely of the vehicle body. If this displacement or vibration is directly transmitted to the exhaust gas pipe assembly H, the exhaust gas pipe assembly H is inevitably subjected to displacement or vibration in the direction transversely of the vehicle body. As a result, an impact force is exerted on joints between the exhaust gas pipe assembly H and the exhaust gas manifolds, thereby lowering the durability of the exhaust gas pipe assembly H.

According to the present invention, because the elastic member 31 of the first support member 25 effectively absorbs the relative displacement or vibration between the exhaust gas pipe assembly H and the transmission casing 3a in the direction transversely of the vehicle body, the transmission of displacement or vibration from the transmission casing 3a to the exhaust gas pipe assembly H is restrained, thereby enhancing the durability of the exhaust gas pipe assembly H. As described above, because the allowance of displacement thereof in the direction longitudinally of the vehicle body is small, it is difficult for the first support member 25 to absorb the relative displacement or vibration in this direction.

As to the displacement in the direction longitudinally of the vehicle body, because the exhaust gas pipe assembly H is secured to the exhaust gas manifolds fixedly mounted on the engine E, displacement of the exhaust gas pipe assembly H occurs substantially together with that of the transmission casing 3a. Accordingly, the relative displacement between the exhaust gas pipe assembly H and the transmission casing 3a is extremely small, and no problems occur.

The upper hanger 32 of the first support member 25 is connected with the transmission casing 3a at a location generally below the longitudinal axis L of the output shaft. In other words, the exhaust gas pipe assembly H is supported generally centrally of the vehicle body in the direction transversely of the vehicle body. Because of this, the exhaust gas pipe assembly H is well-balanced in this direction. It is therefore unlikely that the exhaust gas pipe assembly H is subjected to vibration, and the durability of the exhaust gas pipe assembly H is enhanced.

As described above, because the rigidity of the first branch pipe 18 is high, the flange 14a adjacent thereto has a high rigidity. Furthermore, because the lower hanger 33 is connected with this flange 14a, the exhaust gas pipe assembly H is firmly supported and the durability thereof is further enhanced.

Figure 5:
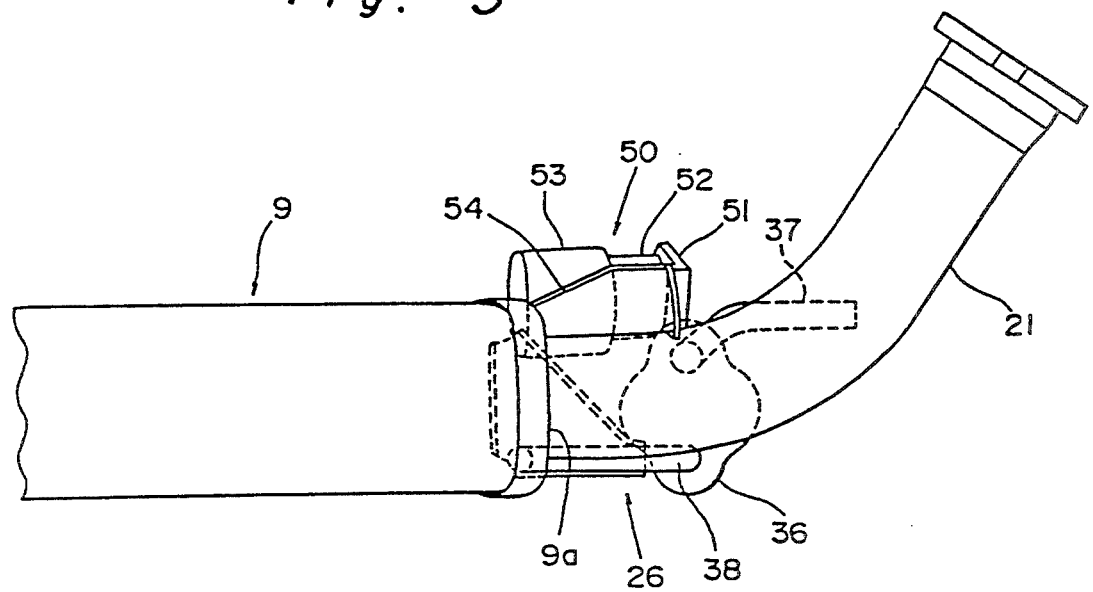
FIG. 5 is a fragmentary side elevational view of the exhaust gas pipe assembly in the proximity of a second support member.
Figure 6:
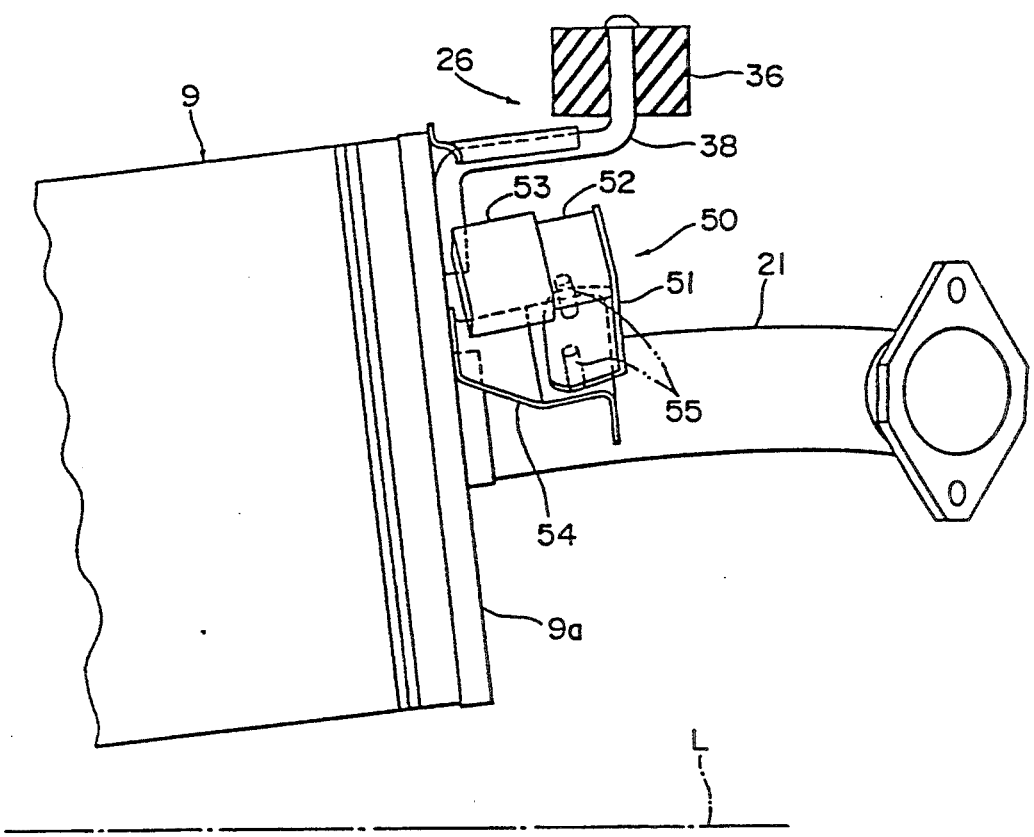
FIG. 6 is a fragmentary top plan view, partly in section, of FIG. 5.
Figure 7:
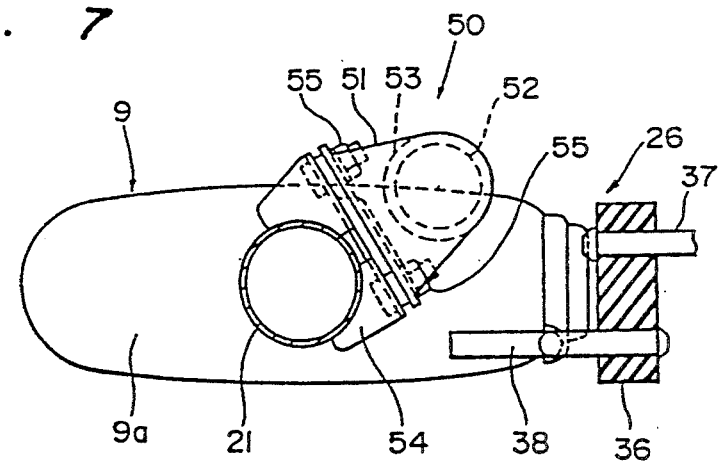
FIG. 7 is a rear elevational view, partly in section, of FIG. 5.

As shown in FIGS. 5 to 7, the second support member 26 generally comprises an elastic member 36 made of an elastic material, for example rubber, an upper hanger 37, and a lower hanger 38. The upper hanger 37 has one end connected with the vehicle body (for example a side frame) and the other end connected with an upper portion of the elastic member 36 whereas the lower hanger 38 has one end connected with a rear portion 9a of the pre-silencer 9 and the other end connected with a lower portion of the elastic member 36.

Both the upper and lower hangers 37 and 38 extend horizontally through the elastic member 36 in the direction transversely of the vehicle body. In the elastic member 36, the lower hanger 38 is located substantially below the upper hanger 37. In other words, the upper and lower hangers 37 and 38 are connected with the elastic member 36 in a manner in which they are vertically spaced from each other and extend in parallel in the direction transversely of the vehicle body. In this case, the elastic deformation of the elastic member 36 is restricted by both the upper and lower hangers 37 and 38 in the direction in which these hangers 37 and 38 extend through the elastic member 36 i.e., in the direction transversely of the vehicle body. As a result, the allowance of displacement of the elastic member 36 becomes small. In contrast, because the elastic deformation is not restricted so much in the direction longitudinally of the vehicle body, the allowance of displacement becomes large. As a result, the elastic member 36 can effectively absorb relative displacement or vibration between the exhaust gas pipe assembly H and the vehicle body in the direction longitudinally of the vehicle body.

A dynamic damper 50 comprising a bracket 51, a rubber 52 and a weight 53 is provided in the proximity of the rear portion 9a of the pre-silencer 9. The dynamic damper 50 is fixedly mounted on a mounting member 54 by means of a plurality of bolts and nuts 55. The mounting member 54 is secured to the rear portion 9a of the pre-silencer 9 and the first rear exhaust gas pipe 21. Because the bracket 51, the rubber 52 and the weight 53 are connected in series in the direction longitudinally of the vehicle body, it is likely that displacement of the weight 53 would occur in directions perpendicular to the direction longitudinally of the vehicle body. Accordingly, the dynamic damper 50 can effectively restrain vibration of the exhaust gas pipe assembly H in directions transversely and vertically of the vehicle body.

In general, when an automotive vehicle is accelerated or decelerated, for example, at the time of starting or stopping, interaction between the vehicle body accelerated or decelerated substantially together with vehicle wheels and the power plant system (including the engine E and transmission 3) mounted thereon occurs due to the inertia of the power plant system. This causes relative displacement or vibration between the power plant system and the vehicle body in the direction longitudinally of the vehicle body. Because the exhaust gas pipe assembly H is connected with the exhaust gas manifolds secured to the engine E, the exhaust gas pipe assembly H together with the power plant system is subjected to relative displacement or vibration with respect to the vehicle body in the direction longitudinally thereof.

In the meantime, the range of temperature change in the exhaust gas pipe assembly H is very wide because high-temperature exhaust gases flow therein. Furthermore, because the exhaust gas pipe assembly H is very long in the direction longitudinally of the vehicle body, the exhaust gas pipe assembly H thermally expands and contracts to a large extent.

With the above reasoning, if the exhaust gas pipe assembly. H is rigidly secured to the vehicle body, the exhaust gas pipe assembly H is subjected to stresses generated in the direction longitudinally of the vehicle body. As a result, the durability of the exhaust gas pipe assembly H is lowered.

According to the present invention, however, because the elastic member 36 of the second support member 26 for connecting the exhaust gas pipe assembly H with the vehicle body effectively absorb relative displacement or vibration between the exhaust gas pipe assembly H and the vehicle body in the direction longitudinally of the vehicle body, no large stresses are generated in the exhaust gas pipe assembly H and the durability thereof is enhanced.

As described above, the transmission of transverse displacement or vibration of the transmission casing 3a caused by the "rolling" to the exhaust gas pipe assembly H is effectively restrained by the first support member 25. However, such displacement or vibration is transmitted to some extent. Because the exhaust gas pipe assembly H is bent rightward at a location slightly forwardly of the pre-silencer 9 and is offset with respect to the longitudinal axis L of the output shaft, there is a possibility of transverse displacement or vibration of the offset portion being amplified. According to the present invention, however, because a dynamic damper 50 for reducing transverse or vertical vibration is provided, the transverse displacement or vibration of the exhaust gas pipe assembly H in the proximity of the pre-silencer 9 is restrained, and therefore, no large stresses are generated in the exhaust gas pipe assembly H.

Figure 8:
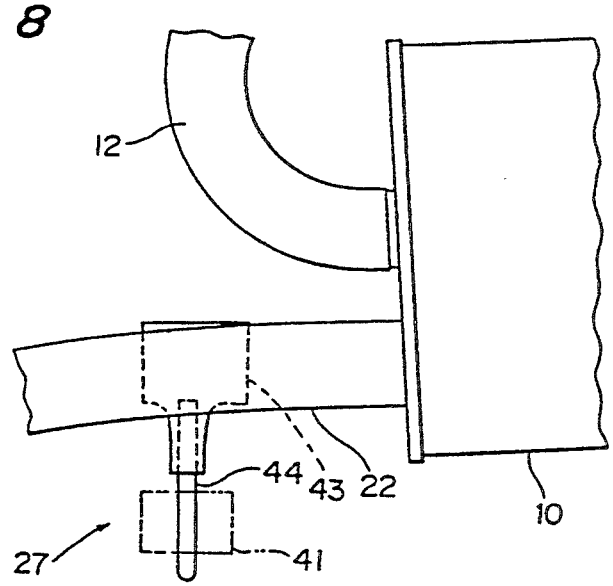
FIG. 8 is a fragmentary top plan view of the exhaust gas pipe assembly in the proximity of a third support member.
Figure 9:
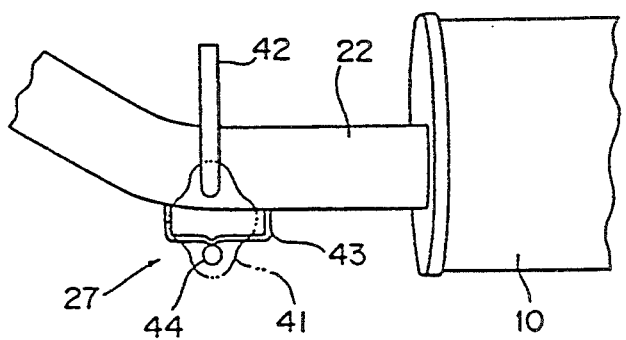
FIG. 9 is a fragmentary side elevational view of FIG. 8.

As shown in FIGS. 8 and 9, the third support member 27 generally comprises an elastic member 41 made of an elastic material, for example rubber, an upper hanger 42, and a lower hanger 44. The upper hanger 42 has one end connected with the vehicle body and the other end connected with an upper portion of the elastic member 41 whereas the lower hanger 44 has one end connected with the second rear exhaust gas pipe 22 via a mounting member 43 and the other end connected with a lower portion of the elastic member 41. The structure of the third support member 27 is substantially the same as that of the second support member 26 shown in FIGS. 5 to 7. In particular, the elastic member 41 can effectively absorb relative displacement or vibration between the vehicle body and the exhaust gas pipe assembly H in the direction longitudinally of the vehicle body.

Figure 10:
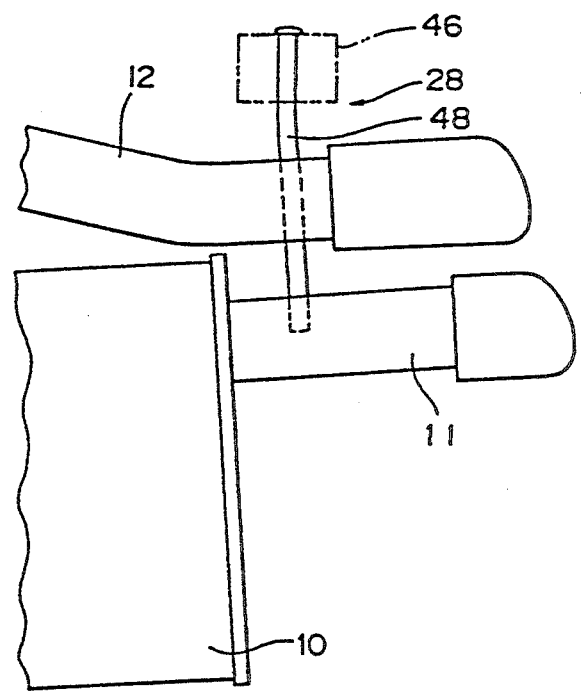
FIG. 10 is a fragmentary top plan view of the exhaust gas pipe assembly in the proximity of a fourth support member.
Figure 11:
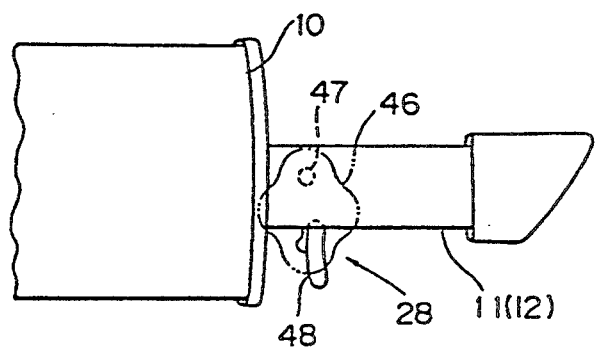
FIG. 11 is a fragmentary side elevational view of FIG. 10.

As shown in FIGS. 10 and 11, the fourth support member 28 generally comprises an elastic member 46 made of an elastic material, for example rubber, an upper hanger 47, and a lower hanger 48. The upper hanger 47 has one end connected with the vehicle body and the other end connected with an upper portion of the elastic member 46 whereas the lower hanger 48 has one end connected with the first and second tail pipes 11 and 12 and the other end connected with a lower portion of the elastic member 46. The structure of the fourth support member 28 is also substantially the same as that of the second support member 26. The elastic member 46 can effectively absorb relative displacement or vibration between the vehicle body and the exhaust gas pipe assembly H in the direction longitudinally of the vehicle body.

When the exhaust gas pipe assembly H is mounted on the vehicle body, the first and second exhaust gas pipes 14 and 15 are initially connected with the corresponding exhaust gas manifolds. Thereafter, the Y-shaped exhaust gas pipe 16 is connected with the first and second exhaust gas pipes 14 and 15 as follows.

The rear flange 14a of the first exhaust gas pipe 14 is initially bolted to the flange 18a of the first branch pipe 18 of the Y-shaped exhaust gas pipe 16. At this stage, the Y-shaped exhaust gas pipe 16 is roughly placed at its predetermined location. Then, while the position of the flange 19a of the second branch pipe 19 is being adjusted, the flange 19a is brought into proper contact with and bolted to the rear flange 15a of the second exhaust gas pipe 15 so that the second branch pipe 19 of the Y-shaped exhaust gas pipe 16 may be connected with the second exhaust gas pipe 15. Because the second branch pipe 19 is longer than the first branch pipe 18 and has a higher elasticity than the latter, as discussed previously, the flange 19a can be easily properly positioned with respect to the flange 15a. Accordingly, even if the first or second exhaust gas pipe 14 or 15 is somewhat inaccurately mounted on the vehicle body, these pipes 14 and 15 can be easily Connected with the Y-shaped exhaust gas pipe 16.

According to the present invention, because an elastic member of a support member provided in the proximity of the engine has a large allowance of displacement in the direction transversely of the vehicle body, the elastic can effectively absorb transverse relative displacement or vibration between the exhaust gas pipe assembly and the power plant. Because of this, the transmission of transverse displacement or vibration of the power plant system caused by the "rolling" to the exhaust gas pipe assembly is restrained.

Furthermore, because each of elastic members of a plurality of support members provided in the proximity of the pre-silencer and the main silencer has a large allowance of displacement in the direction longitudinally of the vehicle body, the elastic members can effectively absorb longitudinal relative displacement or vibration between the exhaust gas pipe assembly and the vehicle body. Accordingly, even if the exhaust gas pipe assembly is subjected to longitudinal displacement or vibration due to acceleration or deceleration of the vehicle body or thermal expansion thereof, no large stresses are generated in the exhaust gas pipe assembly and the durability thereof is enhanced. Also, because a dynamic damper is provided for reducing vibration of the exhaust gas pipe assembly in the proximity of an exhaust gas chamber both in the direction transversely of the vehicle body and in the vertical direction, the durability of the exhaust gas pipe assembly is further enhanced, thereby improving the reliability thereof.

The offset arrangement of the exhaust gas pipe assembly with respect to the longitudinal axis of an engine output shaft reduces the possibility of interference between the exhaust gas pipe assembly and the power plant system, thereby facilitating the layout on the vehicle body.

In addition, because a first exhaust gas passage communicating with a first row of cylinders includes a first branch pipe having a relatively high rigidity and a second exhaust gas passage communicating with a second row of cylinders includes a second branch pipe having a relatively high elasticity, the second exhaust gas passage can be readily assembled after the assembling of the first exhaust gas passage. In this case, while the rear exhaust gas pipe assembly located downstream from a junction of the first and second exhaust gas passages is being firmly supported by the first exhaust gas passage, variations or errors in assembling a plurality of members constituting the exhaust gas pipe assembly are effectively absorbed during the assembling of the second exhaust gas passage by making use of the elasticity thereof.

Also, the exhaust gas pipe assembly is supported by a support member at a location in the proximity of an extension line of the longitudinal axis of the engine output shaft, and the support member is connected with one of flanges of the first exhaust gas passage having a relatively high rigidity. As a result, the exhaust gas pipe assembly is well-balanced in the direction transversely of the vehicle body.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An exhaust gas pipe assembly for discharging exhaust gases issued from an automotive engine disposed longitudinally of a vehicle body, said exhaust gas pipe assembly extending generally rearwardly from the engine and comprising:
    a plurality of exhaust gas pipes;
    at least one chamber formed intermediately of the exhaust gas pipe assembly;
    a first support member, disposed in the proximity of the engine, for supporting the exhaust gas pipe assembly;
    at least one second support member, disposed in the proximity of said chamber, for supporting the exhaust gas pipe assembly; and
    a dynamic damper for reducing vibration of the exhaust gas pipe assembly in directions generally perpendicular to the longitudinal direction of the vehicle body, said dynamic damper having one end connected to said exhaust gas pipe assembly and said dynamic damper having a weight disposed for displacing in a direction perpendicular to the longitudinal direction of said vehicle body.

2. The exhaust gas pipe assembly according to claim 1, wherein said chamber is offset from a longitudinal axis of an engine output shaft.

3. An exhaust gas pipe for discharging exhaust gases issued from an automotive engine as claimed in claim 1, wherein said dynamic damper further comprises a bracket attached to said exhaust gas pipe assembly, and a rubber secured to both said weight and said bracket at its end portions, and said weight, said bracket, and said rubber are disposed in the longitudinal direction of the vehicle body.

4. An exhaust gas pipe assembly for discharging exhaust gases issued from an automotive engine as claimed in claim 1, wherein said first support member is capable of effectively absorbing relative displacement between the exhaust gas pipe assembly and the vehicle body in a direction transverse to the vehicle body.

5. An exhaust gas pipe assembly for discharging exhaust gases issued from an automotive engine as claimed in claim 1, wherein said second support member is capable of effectively absorbing relative displacement between the exhaust gas pipe assembly and the vehicle body in a direction longitudinally relative to the vehicle body.

6. An exhaust gas pipe assembly for discharging exhaust gases issued from an automotive engine having two rows of cylinders and disposed longitudinally of a vehicle body, said exhaust gas pipe assembly extending generally rearwardly from the engine and comprising:
    a first exhaust gas pipe disposed on one side of the engine;
    a second exhaust gas pipe disposed on the other side of the engine;
    a generally Y-shaped exhaust gas pipe disposed generally rearwardly of the engine and having two branch pipes; of which a first branch pipe is connected with said first exhaust gas pipe and a second branch pipe is connected with said second exhaust gas pipe, said first branch pipe being shorter than said second branch pipe; and
    a support member having one end adapted to be connected with a transmission at a location in the proximity of an extension line of a longitudinal axis of an engine output shaft and the other end connected with a joint between said first exhaust gas pipe and said first branch pipe of said Y-shaped exhaust gas pipe.

7. The exhaust gas pipe assembly according to claim 6, wherein said support member is capable of effectively absorbing relative displacement between the exhaust gas pipe assembly and the vehicle body in a direction transversely of the vehicle body.

8. An exhaust gas pipe assembly for discharging exhaust gases issued from automotive engine disposed longitudinally of a vehicle body, said exhaust gas pipe assembly extending generally rearwardly form the engine and comprising:
    a pair of front exhaust gas pipes disposed on respective sides of the engine;
    a generally Y-shaped exhaust pipe having a pipe body and two branch pipes connected with rear ends of said front exhaust gas pipes, respectively;
    a first rear exhaust gas pipe having a front end connected with a rear end of said pipe body of said Y-shaped exhaust gas pipe and having a chamber formed intermediately thereof;
    a second rear exhaust gas pipe having a front end connected with a rear end of said first rear exhaust gas pipe;
    a first support member having one end adapted to be connected with a transmission disposed rearwardly of the engine and the other end connected to one of said front exhaust gas pipes;

a second support member having one end connected with said chamber and the other end connected with the vehicle body; and a dynamic damper, disposed in the proximity of said second support member, for reducing vibration of the exhaust gas pipe assembly in directions generally perpendicular to the direction longitudinally of the vehicle body.

9. The exhaust gas pipe assembly according to claim 8, wherein said pair of front exhaust gas pipes are disposed generally symmetrically with respect to a longitudinal axis of the engine output shaft, wherein a longitudinal axis of said pipe body of said Y-shaped exhaust gas pipe generally coincides with the longitudinal axis of the engine output shaft, and wherein said first and second rear exhaust gas pipes are offset from the longitudinal axis of the engine output shaft.

10. The exhaust gas pipe assembly according to claim 9, further comprising at least one third support member for supporting said second rear exhaust gas pipe, said third support member being capable of effectively absorbing relative displacement between the exhaust gas pipe assembly and the vehicle body in a direction longitudinally of the vehicle body.

11. The exhaust gas pipe assembly according to claim 10, wherein said first support member comprises an elastic member and two hanger members extending through said elastic member in a direction longitudinally of the vehicle body whereas each of said second and third support members comprises an elastic member and two hanger members extending through said elastic member in a direction transversely of the vehicle body.

12. The exhaust gas pipe assembly according to claim 8, wherein said chamber is a pre-silencer disposed intermediately of said first rear exhaust gas pipe and further comprising a catalytic converter accommodated in said Y-shaped exhaust pipe and a main silencer connected with said second rear exhaust gas pipe.

13. An exhaust gas pipe assembly for discharging exhaust gases issued from an automotive engine as claimed in claim 8, wherein said first support member is capable of effectively absorbing relative displacement between the exhaust gas pipe assembly and the vehicle body in a direction transverse to the vehicle body.

14. An exhaust gas pipe assembly for discharging exhaust gases issued from an automotive engine as claimed in claim 8, wherein said second support member is capable of effectively absorbing relative displacement between the exhaust gas pipe assembly and the vehicle body in a direction longitudinally relative to the vehicle body.

15. An exhaust gas pipe assembly for discharging exhaust gases issued from an automotive engine disposed longitudinally of a vehicle body, said exhaust gas pipe assembly extending generally rearwardly from the engine and comprising:

a plurality of exhaust gas pipes;

at least one chamber formed intermediately of the exhaust gas pipe assembly;

a first support member, disposed in the proximity of the engine, for supporting the exhaust gas pipe assembly;

at least one second support member, disposed in the proximity of said chamber, for supporting the exhaust gas pipe assembly, said second support member having an elastic member; and a dynamic damper, disposed substantially closer to said second support member than to said first support member, for reducing vibration of the exhaust gas pipe assembly in directions generally perpendicular to the longitudinal direction of the vehicle body.

16. An exhaust gas pipe for discharging exhaust gases issued from an automotive engine as claimed in claim 15, wherein said dynamic damper comprises a weight, a bracket attached to said exhaust gas pipe assembly, and a rubber secured to both said weight and said bracket at its end portions, and said weight, said bracket, and said rubber are disposed in the longitudinal direction of the vehicle body.

17. An exhaust gas pipe assembly for discharging exhaust gases issued from an automotive engine as claimed in claim 15, wherein said first support member is capable of effectively absorbing relative displacement between the exhaust gas pipe assembly and the vehicle body in a direction transverse to the vehicle body.

18. An exhaust gas pipe assembly for discharging exhaust gases issued from an automotive engine as claimed in claim 15, wherein said second support member is capable of effectively absorbing relative displacement between the exhaust gas pipe assembly and the vehicle body in a direction longitudinally relative to the vehicle body.

19. An exhaust gas pipe assembly for discharging exhaust gases issued from an automotive engine disposed longitudinally of a vehicle body, said exhaust gas pipe assembly extending generally rearwardly from the engine and comprising:

a plurality of exhaust gas pipes;

at least one chamber formed intermediately of the exhaust gas pipe assembly;

a first support member, disposed in the proximity of the engine, for supporting the exhaust gas pipe assembly;

at least one second support member, disposed in the proximity of said chamber, for supporting the exhaust gas pipe assembly; and a dynamic damper, disposed between one c f said exhaust gas pipes and said second support member, for reducing vibration of the exhaust gas pipe assembly in directions generally perpendicular to the longitudinal direction of the vehicle body.

20. An exhaust gas pipe for discharging exhaust gases issued from an automotive engine as claimed in claim 19, wherein said dynamic damper comprises a weight, a bracket attached to said exhaust gas pipe assembly, and a rubber secured to both said weight and said bracket at its end portions, and said weight, said bracket, and said rubber are disposed in the longitudinal direction of the vehicle body.

21. An exhaust gas pipe assembly for discharging exhaust gases issued from an automotive engine as claimed in claim 19, wherein said first support member is capable of effectively absorbing relative displacement between the exhaust gas pipe assembly and the vehicle body in a direction transverse to the vehicle body.

22. An exhaust gas pipe assembly for discharging exhaust gases issued from an automotive engine as claimed in claim 19, wherein said second support member is capable of effectively absorbing relative displacement between the exhaust gas pipe assembly and the vehicle body in a direction longitudinally relative to the vehicle body.

* * * * *